(12) United States Patent
De Vries et al.

(10) Patent No.: US 8,224,354 B2
(45) Date of Patent: Jul. 17, 2012

(54) IDENTIFICATION OF PROXIMATE MOBILE DEVICES

(75) Inventors: Ferdinand Wouter De Vries, Den Haag (NL); Mattijs Oskar van Deventer, Leidschendam (NL); Victor Bastiaan Klos, Den Haag (NL); Edsger Jan Jager, Delft (NL)

(73) Assignees: Koninklijke KPN N.V., Den Haag (NL); Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 123 days.

(21) Appl. No.: 12/669,835

(22) PCT Filed: Jul. 21, 2008

(86) PCT No.: PCT/NL2008/050501
§ 371 (c)(1),
(2), (4) Date: Apr. 8, 2010

(87) PCT Pub. No.: WO2009/014438
PCT Pub. Date: Jan. 29, 2009

(65) Prior Publication Data
US 2010/0210287 A1 Aug. 19, 2010

(30) Foreign Application Priority Data

Jul. 20, 2007 (EP) .................................. 07112886
Dec. 21, 2007 (EP) .................................. 07024942

(51) Int. Cl.
*H04W 4/00* (2009.01)
(52) U.S. Cl. ...................... 455/456.3; 370/328
(58) Field of Classification Search ............... 455/456.3; 370/328
See application file for complete search history.

(56) References Cited

U.S. PATENT DOCUMENTS

| 6,549,625 | B1 | 4/2003 | Rautila et al. |
| 6,735,430 | B1 | 5/2004 | Farley et al. |
| 7,433,677 | B2 | 10/2008 | Kantola et al. |
| 7,602,744 | B2 | 10/2009 | Kaikuranta et al. |
| 2002/0004374 | A1 | 1/2002 | Kantola et al. |
| 2002/0021278 | A1 | 2/2002 | Hinckley et al. |

(Continued)

FOREIGN PATENT DOCUMENTS

| EP | 1650894 A1 | 4/2006 |
| EP | 1677512 A2 | 7/2006 |
| GB | 2362070 A | 11/2001 |

(Continued)

OTHER PUBLICATIONS

Written Opinion published Jan. 20, 2010 for PCT/NL2008/050501, filed Jul. 21, 2008.

(Continued)

*Primary Examiner* — William D Cumming
(74) *Attorney, Agent, or Firm* — Martin Fleit; Paul Bianco; Fleit, Gibbons, Gutman, Bongini & Bianco PL

(57) ABSTRACT

A method of identifying proximate mobile devices, the method comprising the steps of: providing a sensory identifier (ID), a first mobile device (1) detecting the sensory identifier (ID), a second mobile device (2) detecting the sensory identifier (ID), the first mobile device (1) sending a request message associated with the sensory identifier (ID) to the second mobile device (2), and the second mobile device (2) sending an acknowledgement message to the first mobile device (1) so as to establish mutual identification. The sensory identifier (ID) may comprise a visual identifier, such as a bar code, and/or an audio identifier, such as a sound signal. An audio identifier may be produced by tapping the mobile devices together.

25 Claims, 3 Drawing Sheets

U.S. PATENT DOCUMENTS

| | | |
|---|---|---|
| 2005/0219223 A1 | 10/2005 | Kotzin et al. |
| 2006/0088166 A1 | 4/2006 | Karusawa |
| 2007/0174243 A1 | 7/2007 | Fritz |
| 2009/0005004 A1 | 1/2009 | Kantola et al. |

FOREIGN PATENT DOCUMENTS

| | | |
|---|---|---|
| WO | 0101711 A1 | 1/2001 |
| WO | 2005103862 A2 | 11/2005 |

OTHER PUBLICATIONS

"Human-Assisted Pure Audio Device Pairing", HAPADEP, Internet Citation, [online] 2006; pp. 1-11, XP002482020, Retrieved from Internet: URL: http://eprint.iac.org/2007/93.pdg, C. Soriente.

International Search Report published Jan. 29, 2009, for PCT/NL2008/050501, filed Jul. 21, 2008.

International Preliminary Report on Patentability dated Nov. 6, 2009, for PCT/NL2008/050501, filed Jul. 21, 2008.

IDENTIFICATION OF PROXIMATE MOBILE DEVICES

FIELD OF THE INVENTION

The present invention relates to the identification of proximate mobile devices. More in particular, the present invention relates to a method of identifying proximate mobile devices, and to a mobile device capable of identifying other mobile devices located in its spatial proximity.

BACKGROUND OF THE INVENTION

Mobile devices, such as mobile (cellular) telephones, PDAs (Personal Digital Assistants), laptop computers, and (portable) gaming consoles increasingly have multiple functions. Modern mobile telephones, for example, are not only suitable for making telephone calls but often also include a calculator, a calendar, and even games. Mobile phone games are typically designed for a single player, involving only the mobile device they are played on. However, some types of games require multiple players, each player using his/her own device. Before a multiple player game can begin, the players have to be selected and, accordingly, their mobile devices have to be identified.

It is possible to identify other mobile devices using a stored phone list containing the telephone numbers of other mobile devices and the respective names of their owners. However, the phone list contains no information regarding the availability and proximity of the other mobile devices. If a multiple player game is to be played with a group of players who are located in each other's vicinity, for example within viewing distance, the mobile devices of that group have to be identified in another way. Of course it is possible to manually enter the telephone numbers of participating mobile devices, if these numbers are known. However, this is cumbersome and prone to errors, in particular when the telephone numbers have to be read aloud. Accordingly, there is a need for a simple yet effective identification mechanism for mobile devices located in each other's vicinity.

Such an identification mechanism can also be used in mobile devices other than mobile telephones, for example in PDAs, laptop computers and so-called notebook computers. An identification mechanism may not only be used in gaming applications, as PDAs and similar devices may in general need to identify other devices in order to initiate a transaction between the devices. An example of a transaction is exchanging information, such as data files, calendar appointments, and other information.

The identification mechanism would primarily be used for mobile devices which are located in each other's vicinity, as remote devices would not likely be involved in a multiple player game or data exchange. In particular, it is often desired to invite (the owner of) a mobile device to join a game or to exchange calendar data when (the owner of) the mobile device is in view. For the invited mobile device to join the game or exchange data, it first has to be identified. Accordingly, there is a need to automatically identify proximate mobile devices.

International Patent Application WO 2005/103862 (Motorola), for example, discloses a handheld electronic device which includes a context sensing circuit and a microprocessor. The context sensing circuit is capable of detecting contextual characteristics of the device, such as motion of the device or proximity to or contact with another object. The detected contextual characteristics are used to display a virtual physical representation, for example indicating the angle of the device relative to the horizon. A touch sensor is activated by contact with or close proximity to a foreign object, such as the user, and may be used to determine how the device is held by the user. An infra-red (IR) sensor may be used to sense proximity to other objects, including the user's body. These sensors only provide information regarding the presence of other objects, not regarding their identity.

United States Patent Application US 2002/0021278 (Hinckley et al.) discloses a device in which context values are derived from sensors. A proximity sensor uses infra-red (IR) light to detect the proximity of other objects. The proximity sensor includes an IR transmitter and an IR receiver, the strength of the received (scattered) IR light is assumed to be proportional to the distance to the other object. Again, this known proximity sensor is not used to provide information concerning the identity of proximate objects.

Some Prior Art devices are capable of reading information instead of determining the proximity of other objects. For example, European Patent Application EP 1 677 512 (Sharp) discloses a mobile telephone capable of reading bar codes and taking photographs. This known device is capable of recognising bar codes representing URLs (Uniform Resource Locators, that is, references to Internet addresses). These bar codes are therefore not used for identifying mobile devices.

British Patent Application GB 2 362 070 (Nokia) discloses a payment system using mobile communication devices in which the devices are capable of presenting bar codes on their screens, which bar codes may be presented to a service access point for identification purposes. A Bluetooth® connection is then set up with the identified mobile communication device, while expressly excluding other proximate mobile identification devices.

United States Patent Application US 2007/174243 (Fritz) discloses a mobile social search method using mobile telephone devices provided with cameras. The camera of a mobile telephone device captures a bar code representing a certain user interest, upon which the device sends data including the device's location to a central server. The server then searches for other mobile devices having similar locations and having matching user interests. The respective locations of the mobile telephone devices are determined using GPS (Global Positioning System) or triangulation. As a result, this known method requires the mobile telephone system to determine the positions of the devices, and then determine which other devices are within the proximity of the mobile telephone device that scanned the bar code. Accordingly, this known method burdens the mobile telephone network with matching the proximate devices. In addition, the locations determined using GPS and in particular triangulations may be inaccurate, leading to undesired "matches".

SUMMARY OF THE INVENTION

It is an object of the present invention to overcome these and other problems of the Prior Art and to provide a method of identifying proximate mobile devices which is both simple and efficient, and which is virtually independent of the particular mobile telephone network used by the mobile devices.

It is another object of the present invention to provide a mobile device, a server and a mobile communication system for use in such a method.

Accordingly, the present invention provides a method of identifying proximate mobile devices, the method comprising the steps of:
 providing a sensory identifier,
 a first mobile device detecting the sensory identifier,
 a second mobile device detecting the sensory identifier, the first mobile device sending a request message associated with the sensory identifier to the second mobile device, and the second mobile device, upon receipt of the request message, sending an acknowledgement message to the first mobile device so as to establish mutual identification.

By letting both (or all) mobile devices detect the same sensory identifier, it is ensured that these mobile devices are proximate, as the detection of the sensory identifier typically requires the proximity of the mobile devices to the sensory identifier, and hence to each other. By letting the first mobile device send a request message associated with the sensory identifier to the second mobile device and by letting the second mobile device return an acknowledgement message, a mutual identification is achieved.

It is noted that in the method of the present invention, it is not necessary to know the absolute positions of the mobile devices, only their proximity has to be determined. This makes the method of the present invention simpler and more efficient than that of, for example, US 2007/174243 mentioned above.

The request message and the acknowledgement message may be sent via the mobile telephone network, but are preferably sent using a separate system, for example using an infra-red (IR) transmitter or a radio frequency (RF) transmitter having an operating frequency which is different from that of the mobile telephone network. Advantageously, Bluetooth® technology could be used.

The request message is associated with the sensory identification in such a way that the second mobile device can distinguish the request message associated with a particular sensory identifier from the request message associated with another, different sensory identifier. The acknowledgement message may similarly be associated with the sensory identifier, but this is not essential.

Preferably, the request message comprises sensory identifier information. That is, the request message may comprise information contained in or represented by the sensory identifier. If the sensory identifier is a bar code, for example, then that bar code will typically represent a number (numeric code). Accordingly, the sensory identifier information is that number and may be contained in the request message so as to uniquely identify the request message produced in response to the particular sensory identifier. Similarly, the acknowledgement message may comprise sensory identifier information, although this is not essential.

Advantageously, the step of sending the request message and/or the step of sending the acknowledgement message may involve broadcasting. That is, these messages may not be aimed at a single device only, but may be broadcast so as to be received by all active (proximate) mobile devices. In accordance with the present invention, only the mobile device(s) having detected the particular sensory identifier respond(s) by sending an acknowledgement message in return.

In addition to detecting the sensory identifier, it may be verified. An advantageous embodiment therefore further comprises the step of verifying a detected sensory identifier, which step preferably involves a server. The step of verifying may involve comparing the detected sensory identifier with a predetermined format to ensure that the detected identifier is a true identifier, and to determine its characteristics. The step of verifying may also, or alternatively, involve pattern recognition techniques which may be known per se. The verification step may be carried out by a mobile device, but is preferably carried out by a server. That is, the mobile device may send the detected sensory identifier (or sensory identifier information) to a server, which verifies the sensory identifier and reports back to the mobile device. Adding a verification step reduces the chance of errors and increases security.

It is noted that the term "sensory identifier" is meant to include audio identifiers, such as sound signals, visual identifiers, such as visible symbols and codes, scent identifiers, such as smells, touch identifiers, such as Braille patterns, and movement identifiers, such as (common) movements. Accordingly, the present invention uses audio identifiers, visual identifiers and/or other identifiers to identify proximate mobile devices.

As mentioned above, the sensory identifier may comprise a visual identifier, such as a symbol, a spatial and/or temporal pattern, or a bar code. Alternatively, or additionally, the sensory identifier may comprises an audio identifier, such as a sound signal, and/or a movement identifier, such as a common movement of the mobile devices. In all cases, the sensory identifier information may comprise the (absolute or relative) point in time at which the sensory identifier occurs.

In a particularly advantageous embodiment, the audio identifier is produced by clapping hands or by tapping the mobile devices together. Clapping hands produces an audio identifier of which the point in time at which it occurs is clearly defined. The distance at which clapping hands may be detected by mobile devices may be relatively large. Tapping the mobile devices together produces an audio identifier which typically may be detected more locally and which, due to the very short distance between the source of the sound and the microphones of the mobile devices, may be detected almost immediately.

It is preferred that the sensory identifier comprises (at least) two consecutive signals, or at least multiple signals. By using two consecutive sound signals, for example, both a better detection and a (relative) time stamp may be achieved. Instead of multiple sound signals, multiple (consecutive or non-consecutive) video signals may be used, for example, two light flashes, or to particular colours.

The time stamp, which serves as sensory identifier information, may be defined as the time duration between the two consecutive time signals. Although a single sound signal can be used as sensory identifier, its characterising information comprising the absolute point in time at which it occurs, multiple sound signals provide the advantageous option of using a relative time duration as characterising information (time stamp), which is easier to measure and requires no clock synchronisation. Of course, clock synchronisation may be carried out using known means, such as broadcasting synchronisation signals, derived from a reference clock (e.g. an atomic clock), using radio signals.

Accordingly, the step of detecting the sensory identifier may involve producing a time stamp, which time stamp may comprise the time interval between two (consecutive or non-consecutive) sound signals.

Although the method of the present invention has been described above with reference to two mobile devices, the invention is not so limited and may also be practised using three, four, five, or more mobile devices. Accordingly, advantageous embodiments of the present invention may further comprise the steps of:

a third mobile device detecting the sensory identifier, the third mobile device, upon receipt of the request message, sending an acknowledgement message to the first mobile device so as to establish mutual identification.

In this way, a third proximate mobile device, and any further proximate mobile devices, may be identified. A method of such an embodiment may further comprise the step of:

the first mobile device, upon receipt of an acknowledgement message from the third mobile device, sending an update message to the second mobile device.

The update message, which serves to inform other mobile devices (such as the second) that a third mobile device has been successfully identified, may contain an identification of each identified proximate device. This identification, which may comprise a device serial number, a mobile telephone number, a SIM card number and/or any other suitable identification, serves to determine which mobile devices have been identified, allowing the mobile devices to compile a list of identified proximate mobile devices. Accordingly, it is preferred that update messages are exchanged between the identified proximate devices.

In this way, all mobile devices involved can "know" that their identities have been received by the other mobile devices. Advantageously, the method may further comprise the step of each mobile device maintaining a list of mobile devices identified within a predetermined time period.

In an advantageous embodiment, a mobile device may have a state which is changed in response to a detected sensory identifier. That is, detecting the sensory identifier may cause the mobile device to change the state it is in. For example, its state may change from "mobile communication" or "standby" into "proximate identification".

The present invention further provides a method of pairing at least two mobile devices, the method comprising the method of identifying proximate mobile devices as defined above.

The present invention additionally provides a computer program product for carrying out the method defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet. The computer program product may be loaded into a mobile device used in the present invention. If a server common to the mobile devices is used, a computer program product for use in the common server may also be provided.

The present invention also provides a mobile device for use in the method defined above, the mobile device comprising:
 a detection unit, such as a camera unit, a microphone unit and/or a movement detection unit, for detecting a sensory identifier, and
 a processor unit arranged for sending a request message associated with the sensory identifier to another mobile device.

Instead of, or in addition to a camera unit, a scanner unit may be used for scanning symbol codes, such as bar codes.

Preferably, the mobile device further comprises a memory unit for maintaining a list of mobile devices identified within a predetermined time period. The processor unit of the mobile device may further be arranged for verifying the detected sensory identifier by forwarding the detected sensory identifier to a verifying server.

The present invention additionally provides a server for use with the method defined above and/or at least one mobile device defined above, which server comprises a processor unit for processing data, a memory unit for storing data and a communication unit for communicating with the at least one mobile device. The processor unit is preferably arranged for verifying sensory identifiers, which identifiers have been received from the at least one mobile device.

The processor unit of the server may further be arranged for maintaining a record of successful identifications and preferably also assigning different roles to the various mobile devices, for example roles in different games. Accordingly, the processor of the server may be arranged for applying game rules for games involving the at least one mobile device, and/or be arranged for applying business rules for business transactions involving the at least one mobile device.

In addition, the present invention provides a mobile communication system comprising a mobile device and/or a server as defined above.

BRIEF DESCRIPTION OF THE DRAWINGS

The present invention will further be explained below with reference to exemplary embodiments illustrated in the accompanying drawings, in which.

DETAILED DESCRIPTION OF THE INVENTION

Figure 1:
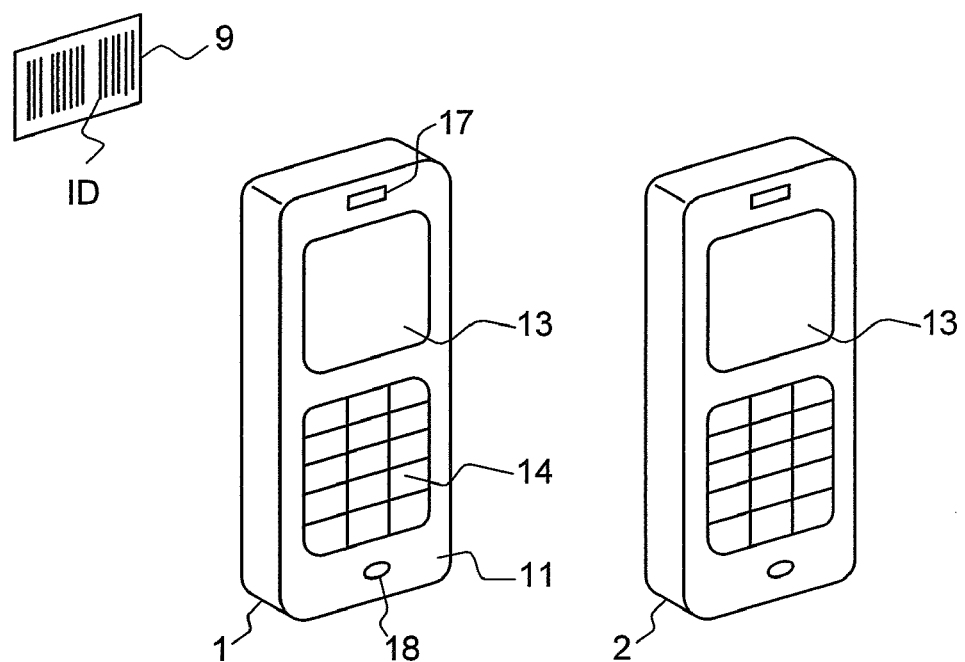
FIG. 1 schematically shows a set of mobile devices according to the present invention.

The set of mobile devices shown merely by way of non-limiting example in FIG. 1 comprises a first mobile device 1 and a second mobile device 2. In the example shown, the mobile devices are mobile (cellular) telephone devices which may, however, also incorporate other functions, such as PDA (Personal Digital Assistant) functions.

Figure 2:
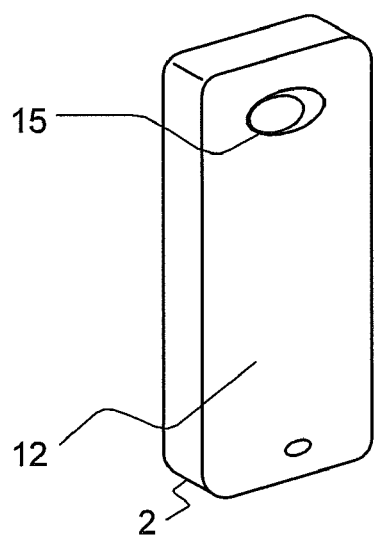
FIG. 2 schematically shows a mobile device according to the present invention which is provided with a camera.

Each mobile device 1, 2 has a front face 11 on which a display screen 13, a keypad 14, a loudspeaker 17 and a microphone 18 are arranged. It will be understood that the loudspeaker and/or the microphone may alternatively be arranged on a side face of the device. As shown in FIG. 2, each mobile device may have a bar code scanner or camera 15 arranged at its rear face 12.

In accordance with the present invention, the mobile devices 1, 2 are capable of detecting a sensory identifier. The sensory identifier ID shown in FIG. 1 is constituted by a bar code. This bar code may be "read" by a bar code scanner or a camera of a mobile device, as shown in FIG. 2.

A visual identifier, such as a bar code or a symbol, may be applied on a sticker or label 9. Instead of a stationary spatial pattern, such as the regular bar code shown in FIG. 1, a temporal pattern may be used, such as a blinking pattern or symbol of which the frequency and/or time intervals contain the identifying information. Accordingly, the visual identifier may be constituted by a spatial and/or temporal pattern, for example produced by a display (such as an advertising display in a shop or shop window) or a light.

The sensory identifier may alternatively, or additionally, comprise an audio identifier, such as a sound signal. The audio identifier may be rendered by a loudspeaker of a mobile device, or may be produced by a percussive element external to the mobile device, such as a drum or a tuning fork. Alternatively, or additionally, the audio identifier may be produced by clapping hands or by tapping the mobile devices together.

The sensory identifier may be accompanied by a time stamp. This allows sensory identifiers from multiple sources to be distinguished.

Figure 3:
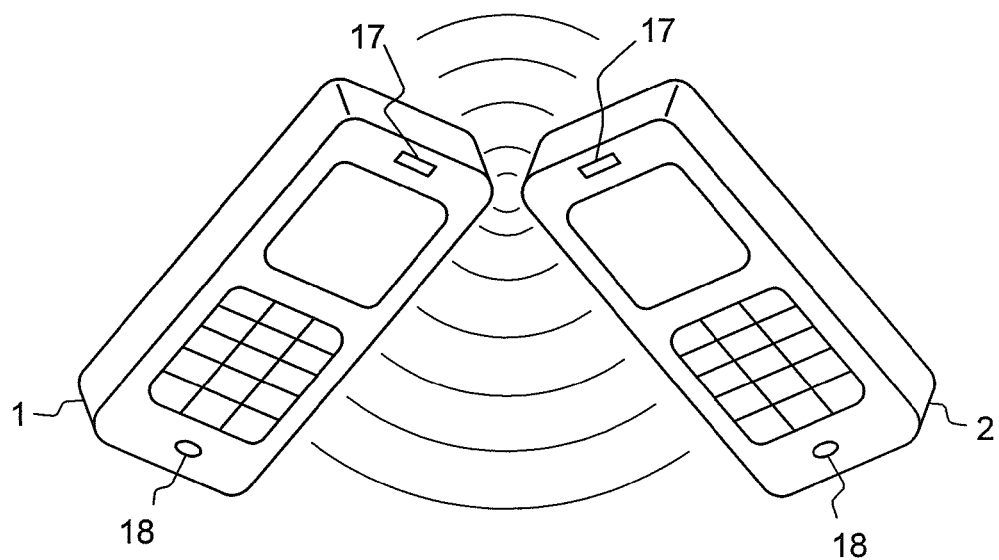
FIG. 3 schematically shows mobile devices according to the present invention which are provided with loudspeakers and microphones.

In accordance with the present invention, the identifier may also be an audio identifier. This is illustrated in FIG. 3, where the identifier (ID in FIG. 1) is produced by tapping the mobile devices 1 and 2 together. The tapping sound is received by the microphones 18 of both mobile devices. The audio identifier may alternatively be constituted by a sound signal produced by a loudspeaker (e.g. a loudspeaker 17), the sound signal preferably consisting of multiple tones and/or pulses so as to be able to distinguish a plurality of different identifiers and/or time stamps.

Alternatively, or additionally, scent identifiers and/or touch identifiers may be used. The mobile devices may, in such embodiments, be capable of detecting smells which are also detected by another mobile device, or may be capable of sensing the surface of another object or device, the sensed surface containing touch identifiers, for example Braille symbols. Movement detectors for detecting (common) movements of the mobile devices may also be used. The present invention is therefore not limited to audio or visual identifiers.

The sensory identifiers, in the examples of FIGS. 1-3 audio identifiers and visual identifiers, serve to identify the mobile devices when they are located in each other's proximity. The method of identifying serves to determine the identity of the other device, which identity may subsequently be used for exchanging information and/or playing games. More in particular, the method of identifying according to the present invention comprises several steps, including at least the steps of a first mobile device detecting a sensory identifier (such as a bar code or an audio signal) and sending a request message associated with the sensory identifier to the second mobile device. It is further possible to verify the detected identifier by comparing the identifier with a predetermined format, range or similar measure. Pattern recognition techniques may be used to match the detected identifier with a stored identifier format and/or to recognize the detected identifier.

Figure 4:
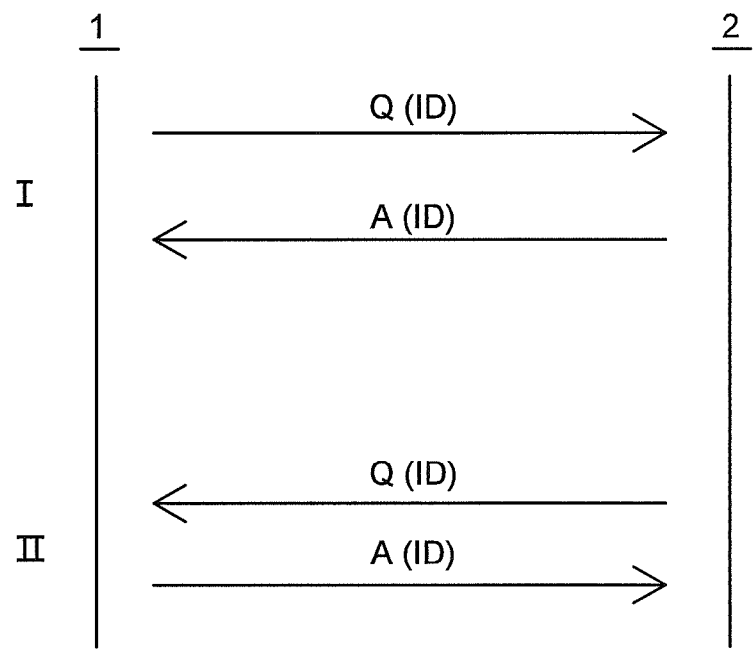
FIG. 4 schematically shows a data exchange between mobile devices according to the present invention.

An exemplary identification procedure is illustrated in FIG. 4, where the exchange of information between two mobile devices 1 and 2 is schematically illustrated.

In the first information exchange I, the first mobile device 1 initially detects an identifier ID. This identifier may be verified, either by the mobile device itself or, via the mobile telephone network or any other network, by a server. Upon successful detection and/or verification, the first mobile device 1 sends a request message Q(ID) to other mobile devices, in the present example to the second mobile device 2. This request message Q(ID) may be broadcast, so as to reach all mobile devices within reach. As mentioned above, the request message is preferably sent using IR or RF technology, for example using Bluetooth® technology, but may also be sent using the mobile telephone network. The request message Q(ID) preferably contains the information contained in the sensory identifier ID, that is, the number or alphanumeric code represented by the sensory identifier ID. Alternatively, data representing this information could be contained in the request message Q(ID) so as to be able to determine the association of the request message with the particular sensory identifier ID.

If the second mobile device 2 has also detected the sensory identifier, it sends an acknowledgement message A(ID) to the first mobile device, in response to receiving the request message Q(ID). To this end, the second mobile device 2 preferably checks whether the request message Q(ID) is associated with the particular detected sensory identifier ID, for example by examining the content of the request message R(ID). If the second mobile device 2 has detected more than one sensory identifier, for example ID, ID1 and ID2, it checks with which sensory identifier the received request message Q(ID) is associated. If a match is found, the second mobile device 2 sends an acknowledgement message A(ID) which preferably is associated with the detected sensory identifier ID, that is, which allows the first mobile device 1 to determine that the acknowledgement is related to the particular request message Q(ID), and preferably also allows to determine that the acknowledgement is related to the particular sensory identifier ID.

In this way, a confirmed mutual identification of the devices may be achieved. In the second information exchange II, the roles of the mobile devices are reversed. However, the information exchange is similar and also leads to a mutual identification. It will be understood that the scheme of FIG. 4 may readily be expanded to include more than two mobile devices, such as three, four or more mobile devices.

In preferred embodiments of the present invention each mobile device stores a list of mobile devices it has identified within a certain time period. Every new sensory identifier can then be compared with the list so as to avoid double (mutual) identifications. When a certain sensory identifier is detected for the second time, no request or acknowledgement message is sent.

In addition, the detection of a sensory identifier is preferably only valid for a limited time duration, for example 10 seconds or 2 minutes, in order to avoid undesired identifications of mobile devices which are no longer in the vicinity of the sensory identifier, and to limit the number of identified devices.

According to an aspect of the present invention, successful identifications allow mobile devices to enter into transactions with each other. According to a further aspect of the present invention, these identifications typically alter the state of each mobile device, for example from a first state "available for gaming" into a second state "engaged in gaming". In this way, the identifiers can be used for carrying out a protocol. For some protocols, the actual identities of the devices involved may be irrelevant and only their proximity may matter.

The identification techniques used in the present invention automatically select proximate devices, that is, devices located within a certain, limited range. Both visual and audio identifiers can typically only be detected within a range of a few metres, although audio identifiers may be detected from further away if the amount of background noise is limited. In this document, proximate devices are understood to include devices having a mutual distance ranging from zero or only a few millimetres to several meters or even approximately 100 meters, although larger mutual distances are not excluded and may be used in certain applications.

Sensory identifiers may be accompanied by a time stamp. For example, the moment an audio signal is produced may be registered by the transmitting device, while the moment the audio signal is received is registered by the receiving device. Advantageously, the audio signal contains an indication of the point in time at which it is transmitted, thus allowing the receiving device to quickly determine the time delay and hence the distance between the devices. The point in time at which a signal is produced may be represented by part of the identifier, for example a number of bits of a longer code.

An audio (acoustic) identifier may not only be produced by a loudspeaker, but also by other means. For example, an audio signal could be produced by tapping two mobile devices together, or by tapping one mobile device against another object, such as a table. It is also possible to produce audio identifiers by using a percussive element, for example a drum, pencil, tuning fork or similar element.

The time stamps of the audio signal will allow the receiving devices to determine from which device the sound originated. In addition to a time stamp, most audio identifiers will have characteristics (such as the time and frequency envelopes) which allow them to be distinguished from other audio identifiers and therefore make it possible to trace the identifier to a particular device. If the audio identifier is produced by tapping, it will also be received by the originating device's microphone. The characteristics detected by the receiving device may therefore be compared with the characteristics received by the originating device.

Figure 5:
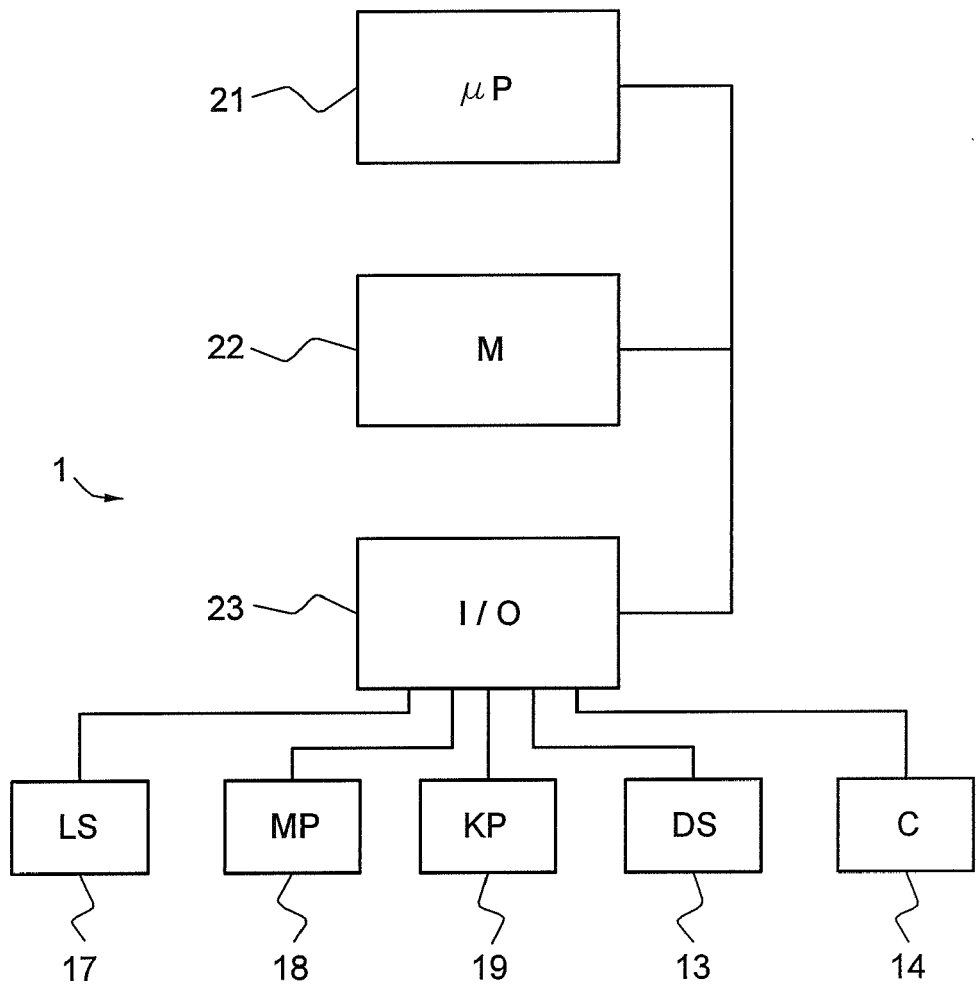
FIG. 5 schematically shows the constituent parts of a mobile device according to the present invention.

An exemplary embodiment of a mobile device according to the present invention is schematically shown in more detail in FIG. 5. The merely exemplary mobile device 1 illustrated in FIG. 5 comprises a microprocessor (μP) 21, a memory (M) 22, an input/output (I/O) unit 23, a display screen (DS) 13, a keypad (KP) 14, a camera (C) 15, a loudspeaker (LS) 17, and a microphone (MP) 18. The microprocessor 21, the memory 22 and the I/O unit 23 are mutually connected by a common bus, while the display screen 13, the camera 15, the loudspeaker 17, the microphone 18 and the keypad 14 are coupled to the I/O unit 23.

The memory 22 contains suitable software programs for operating the mobile device, in particular for carrying out the identifications described above. In addition, the memory 22 may store a list of recently identified mobile devices. This list may be deleted, for example when a certain amount of time has elapsed or when the mobile device is switched off. The memory 22 may also contain a suitable software program for pattern recognition, for detecting and verifying visual identifiers, such as symbol codes.

The camera 15, which in some embodiments may be replaced with a (bar code) scanner, is capable of capturing an image of a visual identifier. Instead of a bar code or other symbol code, another visual identifier can be used, such as a picture of a face. The face (or another substantially unique identifier) may be displayed on the screen of a display device and/or on a sticker. It will understood that the camera may be omitted when only audio identifiers are used. The display screen 22 may be the standard display screen present in mobile devices.

As mentioned above, the present invention makes it possible to (mutually or unilaterally) identify two or more mobile devices. In fact, a whole group of devices may be identified so as to share information (for example pictures, songs, or texts) or to start a common game.

The present invention is particularly suitable for games applications The identification of mobile devices may allow those devices to participate in games. An example of such a game is Live STRATEGO, where each mobile device represents a piece of the game. In such applications, the mobile devices should preferably be able to display a symbol representing the particular piece. Accordingly, the mobile devices of the present invention are preferably suitable for playing games.

The mobile devices may be handheld devices such as mobile telephones or, more in general, portable devices such as laptop computers and PDAs. Although the identification process of the present invention has been described with reference to mobile devices which essentially operate as independent units, the present invention can also be utilised in systems, such as communication systems, in which the mobile devices are partially or fully controlled by or at least communicate with a common server. Part of the identification process could therefore be carried out by such a server.

Figure 6:
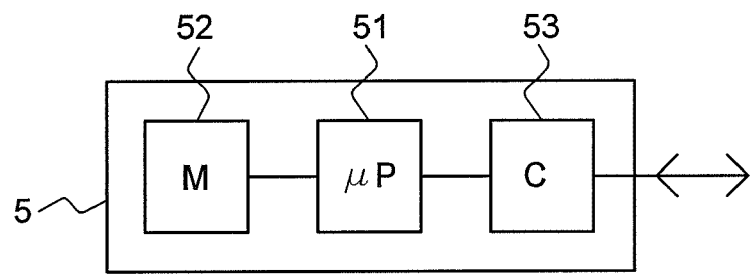
FIG. 6 schematically shows the constituent parts of a server according to the present invention.

A server for use with the method and/or the mobile device defined above is schematically illustrated in FIG. 6. In the exemplary embodiment of FIG. 6, the server 5 is shown to comprise a processor (μP) unit 51 for processing data, a memory (M) unit 52 for storing data, and an input/output and communication (C) unit 53 for communicating with the at least one mobile device, preferably a plurality of mobile devices. The communication with the mobile devices may use suitable wireless technologies, such as GSM, GPRS or UMTS.

The processor unit 51 of the server 5 may be arranged for verifying sensory identifiers (ID in FIG. 1). That is, the mobile device may forward any detected sensory identifiers to the server, for verification by the server. This has the advantage that it is not necessary for the mobile devices to contain suitable software and/or hardware for identification verification. Accordingly, by involving a common server in the verification process, the mobile devices can be kept relatively simple and hence inexpensive.

The processor unit 51 of the server of the present invention may be arranged for producing verification confirmation messages in response to verification demand messages received from the mobile device. These verification confirmation messages may be specific to a particular role of the mobile device, this role being determined by, for example, a game or other activity the mobile device is about to be involved in. The processor unit of the server may advantageously also be arranged for applying game rules for games involving the at least one mobile device.

The present invention is based upon the insight that visual and/or audio identifiers may advantageously be used to identify proximate mobile devices by letting these devices detect the identifiers and then exchange messages to mutually confirm the detection. The present invention benefits from the further insight that a sensory identifier commonly detected by multiple mobile devices can be used for the mutual identification of these devices.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of identifying proximate mobile devices, the method comprising:
   providing a sensory identifier (ID) comprising two consecutive signals, when a first and second mobile device are proximate to each other;
   the first mobile device detecting said providing of the sensory identifier (ID), said detecting producing a time stamp comprising a time interval between two consecutive signals;
   the second mobile device detecting said providing of the sensory identifier (ID), said detecting producing a time stamp comprising a time interval between the two consecutive signals;
   the first mobile device sending a request message (Q(ID)) associated with detection of the providing of the sensory identifier (ID) to the second mobile device; and
   the second mobile device, upon receipt of the request message, sending an acknowledgement message (A(ID)) to the first mobile device so as to establish mutual identification when both the first and second mobile device have detected the same providing of the sensory identifier (ID).

2. The method according to claim 1, wherein the request message (Q(ID)) comprises sensory identifier information.

3. The method according to claim 1, wherein the acknowledgement message (A(ID)) comprises sensory identifier information.

4. The method according to claim 1, wherein the step of sending the request message (Q(ID)) and/or the step of sending the acknowledgement message (A(ID)) involves broadcasting.

5. The method according to claim 1, further comprising the step of verifying a detected sensory identifier (ID), which step preferably involves a server.

6. The method according to claim 1, wherein the step of providing the sensory identifier (ID) comprises visually providing a visual identifier, such as a symbol, a spatial and/or temporal pattern, or a bar code.

7. The method according to claim 1, wherein the step of providing the sensory identifier (ID) comprises auditively providing an audio identifier, such as a sound signal.

8. The method according to claim 7, wherein the audio identifier is provided by clapping hands or by tapping the mobile devices together.

9. The method according to claim 1, further comprising the steps of:
a third mobile device detecting the providing of the sensory identifier (ID),
the third mobile device, upon receipt of the request message (Q(ID)), sending an acknowledgement message (A(ID)) to the first mobile device so as to establish mutual identification.

10. The method according to claim 9, further comprising the step of:
the first mobile device, upon receipt of an acknowledgement message (A(ID)) from the third mobile device, sending an update message to the second mobile device.

11. The method according to claim 10, wherein the update message contains an identification of each identified proximate device.

12. The method according to claim 10, wherein update messages are exchanged between the identified proximate devices.

13. The method according to claim 1, further comprising the step of each mobile device maintaining a list of mobile devices identified within a predetermined time period.

14. The method according to claim 1, wherein a mobile device has a state which is changed in response to the detection of a sensory identifier (ID).

15. A method of pairing at least two mobile devices, the method comprising the method of identifying proximate mobile devices according to claim 1.

16. A computer program product for carrying out the method according to claim 1.

17. The method according to claim 1, further comprising detecting the providing of a sensory identifier (ID) by the first mobile device and the second mobile device using a detection unit configured to produce the two consecutive signals, and to produce the time stamp comprising a time interval between the two consecutive signals, and
sending a request message (Q(ID)) associated with detection of the providing of the sensory identifier (ID) to another mobile device using a processor unit (21).

18. The method according to claim 17, further comprising maintaining a list of mobile devices identified within a predetermined time period using a memory unit.

19. The method according to claim 17, further comprising verifying the detected sensory identifier (ID2) by using the processor unit to forward the detected sensory identifier to a verifying server.

20. The method according to claim 18, further comprising changing a state of the mobile device in response to a detected sensory identifier (ID) using the processor unit.

21. The method according to claim 19, further comprising:
verifying a match between the providing of the sensory identifiers (ID) detected by the first mobile device and the second mobile device including using a server communicable with the first mobile device and the second mobile device, the server comprising a server processor unit for processing data, a memory unit for storing data, and a communication unit for communicating with the mobile device, wherein the server processor unit is configured for verifying the match.

22. The method according to claim 21, wherein the server processor unit is arranged for applying game rules for games involving the mobile device and/or arranged for applying business rules for business transactions involving the mobile devices.

23. The method of claim 1, further including communicating with at least one server communicable with the first and second mobile, the server including a server processer unit for process data, a memory unit for storing data, and a communication unit for communicating data with the first and second mobile devices, the server processor unit configured to verify a match between the providing of the sensory identifiers (ID) detected by the first mobile device and the second mobile device.

24. The method of claim 23, wherein the server processor unit is configured for applying game rules for games involving the mobile device and/or is configured for applying business rules for business transactions involving the mobile device.

25. A mobile device, comprising:
a detector configured to detect a sensory identifier (ID) comprising two consecutive signals, said signals generated when two of the mobile device are proximate to each other;
a processor configured to execute software on non-transitory media, the software configured to produce a time stamp comprising a time interval between the two detected consecutive signals;
a transmitter configured to send a request message (Q(ID)) associated with detection of the sensory identifier (ID) to another of the mobile device, and to send upon receipt of the request message, an acknowledgement message (A(ID)) to the device that sent the request message (Q(ID)), so as to establish mutual identification between two of the mobile devices, when both devices have detected the same sensory identifier (ID).

* * * * *